United States Patent
Griffin

(10) Patent No.: US 7,258,273 B2
(45) Date of Patent: Aug. 21, 2007

(54) METHOD AND SYSTEM FOR FACILITATING A PURCHASE AGREEMENT

(75) Inventor: Michael J. Griffin, Tampa, FL (US)

(73) Assignee: One 28 Marketing, LLC, Tampa, FL (US)

( * ) Notice: Subject to any disclaimer, the term of this patent is extended or adjusted under 35 U.S.C. 154(b) by 124 days.

(21) Appl. No.: 11/154,355

(22) Filed: Jun. 16, 2005

(65) Prior Publication Data

US 2005/0279829 A1    Dec. 22, 2005

Related U.S. Application Data

(60) Provisional application No. 60/580,269, filed on Jun. 16, 2004.

(51) Int. Cl.
  *G06K 5/00* (2006.01)
(52) U.S. Cl. ..................................... 235/380
(58) Field of Classification Search ............ 235/380, 235/375, 487, 486; 705/66, 61, 403
  See application file for complete search history.

(56) References Cited

U.S. PATENT DOCUMENTS

| 2002/0046341 A1* | 4/2002 | Kazaks et al. ............ 713/182 |
| 2003/0053609 A1* | 3/2003 | Risafi et al. ............ 379/114.2 |
| 2003/0144935 A1* | 7/2003 | Sobek ...................... 705/35 |
| 2004/0182922 A1* | 9/2004 | Talarico, Jr. ............ 235/380 |
| 2005/0021363 A1* | 1/2005 | Stimson et al. ........... 705/1 |
| 2005/0051619 A1* | 3/2005 | Graves et al. ............ 235/380 |
| 2006/0149671 A1* | 7/2006 | Nix et al. ................ 705/40 |
| 2007/0057043 A1* | 3/2007 | de la Garza Ortega et al. ....................... 235/380 |

OTHER PUBLICATIONS

Incentive Federation, State Escheat Laws as Applied to Gift Certificates, "The Legal Wrangling of Gift Cards"; Potentials Magazine; Apr. 1, 2005, pp. 1-2; VNU eMedia Inc. USA.
Pricewaterhousecoopers LLP, "Issues Surrounding the Recognition of Gift Card Sales and Escheat Liabilities", QuickBrief journal; Dec. 2004, pp. 1-4, vol. 2, Issue 7; USA.
Furletti, Mark, "Prepaid Cards: How Do They Function? How Are They Regulated?"; Payment Cards Conference Summary, Fed. Reserve Bank of Philadelphia; Jun. 2, 2004; 25 pgs.; USA.
Seligman, Terri J., Loeb&Loeb LLP, "Found Money"; PROMO Magazine; Nov. 1, 2002; New York City, USA.

* cited by examiner

*Primary Examiner*—Daniel Stcyr
*Assistant Examiner*—Edwyn Labaze
(74) *Attorney, Agent, or Firm*—Dennis L. Cook, Esq.

(57) ABSTRACT

The method of the present invention changes the present day "value for value" methodology, system and process for the purchase of Stored Value Card purchases to a "value for greater value" or "value for greater perceived value" methodology, system and process by bundling the actual Stored Value Card product with coupons that would convey a value. The bundling of coupons, vouchers, and etc., with the Stored Value Card allows merchants to charge or allocate a certain fee for the coupon/voucher aspect of the Stored Value Card sale. This in turn allows merchants to transact and/or report and/or account for the sale of Stored Value Cards in a manner that avoids escheatment.

8 Claims, 1 Drawing Sheet

METHOD AND SYSTEM FOR FACILITATING A PURCHASE AGREEMENT

CROSS-REFERENCE TO RELATED APPLICATION

The present application claims the benefit of previously filed, now abandoned, Provisional Patent Application Ser. No. 60/580,269, filed Jun. 16, 2004, and incorporates by reference the contents therein.

FIELD OF THE INVENTION

This invention addresses the need to facilitate a point of sale purchase agreement for Stored Value Cards. Specifically, the invention provides method of implementing a transaction for purchase of Stored Value Cards that eliminates or lessens the State escheatment requirements that apply to sale of such cards.

BACKGROUND OF THE INVENTION

The Stored Value Industry, which is most commonly known as the Gift Card Industry and Prepaid Calling Card Industry, as it exists today, is estimated to be a $60 billion a year industry. It is also estimated there are 1.5 billion individual plastic cards produced annually in order to facilitate this industry. The Stored Value industry markets products to consumers under some very recognizable names such as Gift Card, Prepaid Calling Card, Shopping Card, Merchandise Card, Spending Card, and Shopping Card, all of which are known in the industry as Stored Value Cards. It should also be noted that some merchants are moving away from any of these commonly known names and calling them just their cards. A real world example of this is the "Starbucks Card".

Currently merchants that offer Stored Value Cards do not charge or allocate a fee for the cost of the card production, nor do they charge for any associated packaging such as envelopes that include their brand name or any other gift giving occasion themes, but allocating a fee for such value added items could solve a serious problem for these merchants as described below.

This industry presents a very unique situation in that because the original purchase of the Stored Value Card is technically a pre-paid purchase for a good or service, many cards never get redeemed for products or services while many others only get redeemed for a portion of their full value. The difference between what a consumer originally pays for a Stored Value Card purchase and what is actually redeemed is considered unclaimed property by many States. Industry experts estimate that 10% of the annual $60 billion Stored Value Card purchases go unclaimed. At the time of this writing, approximately 35 State governments mandate by law that this unclaimed property (that part not redeemed) be returned to the state. This is known as escheatment.

Presently the sales of Stored Value Cards are promoted, marketed and sold as a very simple and stand alone transaction at the consumer point of purchase (POP) level as well as the online environment. For instance, if an individual desires to purchase a $100.00 Stored Value Card, they simply give the merchant $100.00 for this purchase. This type of "value for value" transaction is typical and commonplace as it would not make sense for a merchant to discount the sale of a Stored Value Card to the general public as it would only result in the merchant trading a value in return for a lesser value. Additionally, as it exists today Stored Value Cards are typically marketed as a stand alone product without any other accompanying tangible or intangible product.

The problem with the above described methodology is that the "value for value" transaction lends itself to the required escheatment for the reason described above, that is the unredeemed amount is considered unclaimed and abandoned property. The invention as described below outlines a method and process that will make it feasible and legal for merchants to not escheat any unredeemed Stored Value Card monies as required by law. This problem has been recently discussed in much of the recent accounting press such as Price Waterhouse Coopers' QuickBrief!, Volume 2, Issue 7, December 2004, "Issues Surrounding the Recognition of Gift Card Sales and Escheat Liabilities". Also, Loeb & Loeb, LLP discussed the problem in an article called "Found Money" in PROMO Magazine, Nov. 1, 2002. In a conference-held Jun. 2-3, 2004 by the Federal Reserve Bank of Philadelphia titled "Prepaid Cards: How Do They Function? How Are They Regulated?" this matter was discussed at length as shown in the conference summary. All these articles and conferences discuss the problem and the administration issues to comply with the various State laws, but none have presented the novel solution as disclosed in the present application.

SUMMARY OF THE INVENTION

The system and method of the present invention changes the present day "value for value" methodology, system and process for the purchase of Stored Value Card purchases to a "value for greater value" or "value for greater perceived value" methodology, system and process. An example of how this can be accomplished is to bundle the actual Stored Value Card product with coupons that would convey a value. An example of this would be any type of commonplace coupon that extends a consumer a percentage discount off a purchase or provides a two-for-one type discount. Other types of products that resemble coupons are certificates or vouchers that entitle a person to receive or accumulate points provided they make a purchase of a certain product or service, or complete a survey or questionnaire. In the case of a person receiving points, those points in turn would provide the person with certain discounts off future purchases.

The bundling of coupons, vouchers etc. with the Stored Value Card as described above will allow merchants to charge or allocate a certain monetary amount for the coupon/voucher aspect of the Stored Value Card sale. This in turn will allow merchants to transact and/or report and/or account for the sale of Stored Value Cards in a manner that is not currently being done today by allowing for a certain percentage of unredeemed use of the monetary value on the cards to not be subject to escheatment. This is the essence of the Method and System for Facilitating a Purchase Agreement between a merchant and a consumer. It is being referred to as a Purchase Agreement because as outlined below, the consumer is aware of the financial details of the transaction and by evidence of their purchase, agrees to the purchase.

For a fuller understanding of the nature and objects of the invention, reference should be made to the following detailed description taken in connection with the accompanying drawings

BRIEF DESCRIPTION OF THE FIGURES

For a fuller understanding of the nature and objects of the invention, reference should be made to the accompanying drawing, in which.

DESCRIPTION OF THE PREFERRED EMBODIMENT

Figure 1:
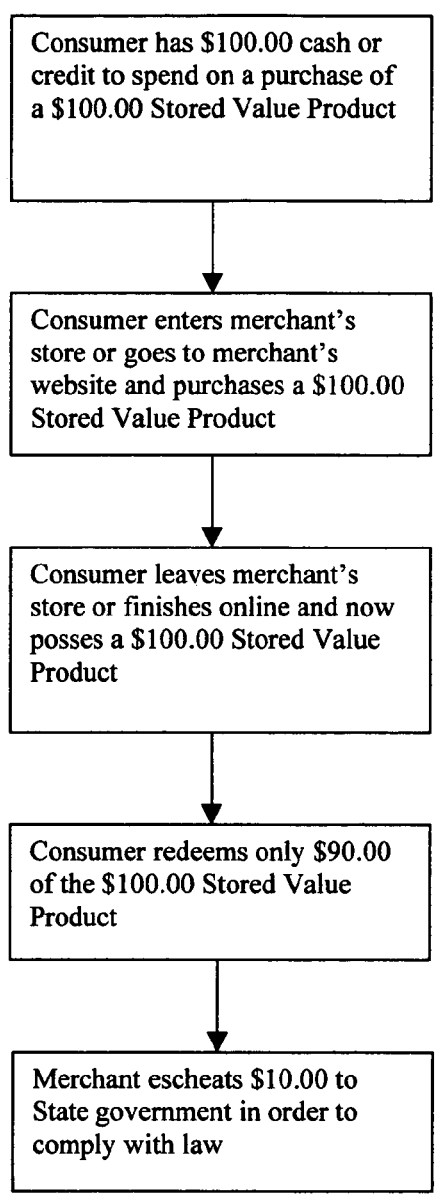
FIG. 1 is a flow diagram showing present day method of selling Stored Value Cards as compared with the method of this disclosure.
Figure 1:
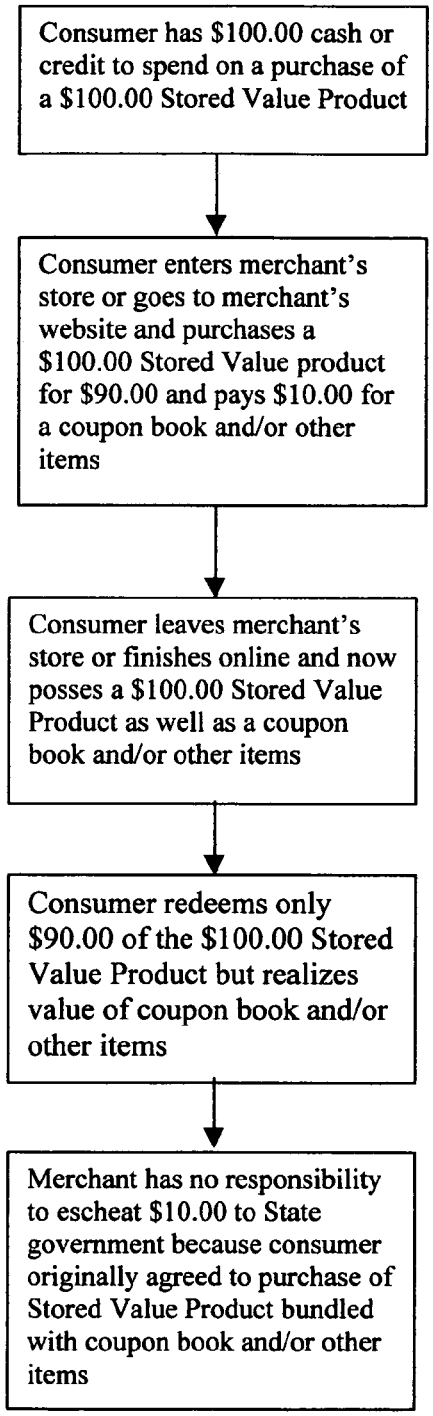

For a more complete understanding of the present disclosure an example of present day accounting vs. accounting with the invention is presented to the reader in FIG. 1 and as follows:

Present Day Methodology and System
  (a) A $100.00 Stored Value Card is purchased for $100.00 from merchant.
  (b) The average consumer spends 90% of the $100.00 leaving $10.00 to the merchant which must be escheated to the State Government, provided the State has such laws.

New Methodology & System as Disclosed

A $100.00 Stored Value Card is bundled with or accompanied with a quantity of coupons/vouchers, which if utilized has a value of hundreds or even thousands of dollars and is purchased for $100.00. For illustration purposes, the merchant may elect to place a $15.00 value on the accompanying coupons/vouchers and place an $85.00 value on their $100.00 Stored Value Card. The consumer realizes the $15.00 value in the same manner and for the same reason millions of books containing coupons and vouchers are sold every year for approximately $15.00. Under this scenario the merchant conveyed a value to the consumer of an amount equal to or greater than $100.00 because of the potential value of the coupons to the consumer. This concept alone will allow the merchant to avoid escheating any money to the States, provided that in this specific case, the consumer redeemed their $100.00 Stored Value Card for at least $85.00 worth of goods or services from the merchant. Under this scenario the merchant's responsibility to convey any more consideration to the consumer has been exhausted because the consumer originally agreed to the terms of Stored Value/Coupon sale by evidence of the purchase itself. To further demonstrate the point; the consumer originally paid $100.00 in good faith for both the coupons and a Stored Value Card and if the consumer chooses to redeem only $85.00 of the Stored Value Card valued at $100.00, they still received a $15.00 value for the coupons. In other words, the consumer paid out $100.00 and received a $15.00 or more perceived value from the coupons/vouchers plus the $85.00 redeemed with the merchant for a total of $100.00. The merchant's fiscal responsibilities to the consumer are concluded and there are no monies to escheat to State governments. Additionally, a merchant may elect to charge up to $100.00 for just the coupon aspect of the desired Stored Value Card sale and give away for free the $100.00 Stored Value Card. This scenario would still accomplish the same desired non-requirement to escheat any monies.

Other examples of how a merchant might execute this invention is to bundle a Stored Value Card with a promotion from a service/subscription provider for 3 free months of service/subscription when the consumer signs up for a year etc. Under this scenario, the merchant might advertise the $100.00 Stored Value Card for $85.00 or any amount less than $100.00 (which in and of itself is attractive to a consumer) along with 12 months of service/subscription at a $15.00 reduced price. This scenario would be attractive to the consumer because they are spending $100.00 and getting in return a $100.00 Stored Value Card and a reduced rate on a service/subscription.

A further example of how a merchant might execute this invention is to sell an inexpensive item for an inflated price or even sell a moderately priced item for a greatly inflated price. An example of this might be to sell a baseball that normally sells $2.00 and mark it up to $15.00. In this case the baseball might, but not necessarily have an autograph of a famous figure on it that effectively increases the value or perceived value in the eyes of the consumer. In this scenario, the merchant might price their $100.00 Stored Value Card for $85.00 and price the baseball at $15.00, thereby collecting a total of $100.00 from the consumer.

Still another example of how a merchant might execute this invention is to sell a sweepstake entry along with their Stored Value Card. In this scenario, the merchant might place an $85.00 value on their $100.00 Stored Value Card and a $15.00 value on the sweepstake entry and collect a total of $100.00 from the consumer.

The specific dollar values as stated above are meant to be for illustration purposes only and in the real world the merchant may wish to increase or decrease any aspect of how they valuate both their Stored Value Cards and the accompanying coupons, vouchers, special offers, incentives, or product(s). Additionally, they may wish to charge a value greater than the value of the Stored Value Card itself because it is sold with or in conjunction with the items previously mentioned.

Due to the fact that the percentage of Stored Value Card purchases that go unredeemed are prone to vary from merchant to merchant as well as from region to region, it might be in the best interest of the merchant to closely match the value they place on the coupon/voucher etc. aspect of the Stored Value Card sale to their non-redemption rate.

The focus of the invention is on the way Stored Value Card (Stored Value) sales are made, both with and without a physical plastic card. An example of a Stored Value Card purchase without a physical card would be in the form of an electronic notice from a giving entity to a receiving entity that the giving entity has provided for the receiving entity an opportunity to shop either online or in a store and that they have $100.00 to spend. As stated above, at the present time Stored Value Card purchases are made as a simple stand alone "value for value" transaction. The invention is for the Stored Value Card purchases to include coupons, vouchers, special offers, incentives and/or products. These coupons and vouchers etc. may be either packaged with the Stored Value Card purchase, or provided to the consumer separately. It would make sense that the merchant conduct one transaction with the consumer, but the merchant might elect to conduct two separate transactions; one for the discounted Stored Value Card and another for the coupons/vouchers etc. that would in theory be for the difference between what the merchant charged for the Stored Value Card and what the actual amount of Stored Value (money) that resides on the Stored Value Card. In the case of a tangible Stored Value Card sold in a merchant's store, the coupons/vouchers aspect of the sale may be in the form of a book or booklet, a CD containing coupons to print, or any other form provided to the consumer to access, including but not limited to an online access.

It is acknowledged and understood that occasionally merchants will give Stored Value Cards to consumers if they purchase a certain good or product. For example, a merchant may give a $50.00 Stored Value Card to the consumer if they purchase a TV valued at $500.00. These types of promotions are not considered within the scope of this invention.

The true nature of this disclosure is not whether a merchant slightly increases the number of Stored Value Cards they give away for promotional reasons, rather it is whether or not they greatly alter the manner in which they are marketing, promoting and selling their Stored Value Cards by converting a significant portion of their Stored Value Card sales from a simple "value for value" transaction to the more complex method as described above.

Because certain changes may be made in the above described system and method for facilitating a purchase agreement without departing from the scope of the invention herein involved, it is intended that all matter contained in the description thereof or shown in the accompanying drawings shall be interpreted as illustrative and not in a limiting sense.

What is claimed is:

1. A method for facilitating a purchase agreement between a purchaser and a vendor for stored value cards to avoid escheatment on an unredeemed amount of such stored value cards comprising:

presenting a stored value card to a purchaser;

said stored value card having a monetary value pre-assigned or assigned at the time of purchase;

presenting one or more additional items of value to said purchaser;

the vendor transferring an amount of the monetary value of said presented stored value card to said presented one or more additional items of value but the purchaser still being able to use the stored value card up to the full amount of the value paid by the purchaser; and, executing the purchase of said presented stored value card and said presented one or more additional items of value in a transaction with the purchaser such that no escheatment would accrue as long as the purchaser uses the pre-assigned or assigned monetary value of said stored value card for purchases valued up to or above the pre-assigned or assigned monetary value stored on said stored value card minus said transferred monetary value amount.

2. The method of claim 1 wherein said one or more additional items of value is a service or subscription to a service.

3. The method of claim 1 wherein said one or more additional items of value is one or more products.

4. The method of claim 1 wherein said one or more additional items of value is a sweepstakes or contest entry.

5. The method of claim 1 wherein said one or more additional items of value is one or more coupons.

6. The method of claim 1 wherein said transferred monetary value amount is based on a monetary amount of previously sold stored value cards that is not normally redeemed by a purchaser.

7. The method of claim 1 wherein the execution of the purchase is via an Internet connection.

8. The method of claim 7 wherein said stored value card is in the form of an electronic notice.

\* \* \* \* \*